United States Patent [19]

Iida et al.

[11] Patent Number: 5,407,561
[45] Date of Patent: Apr. 18, 1995

[54] PRESSURE DECANTER

[75] Inventors: Fusanosuke Iida, Shimizu, Japan; Fitzgerald Stewart, Mandeville, Jamaica; Donald Puxley, Jonquiere, Canada

[73] Assignee: Alcan International Limited, Montreal, Canada

[21] Appl. No.: 59,445

[22] Filed: May 7, 1993

[51] Int. Cl.⁶ .......................................... B01D 21/01
[52] U.S. Cl. ...................................... 210/86; 210/104; 210/208; 210/519; 210/528; 210/803
[58] Field of Search ............... 210/86, 104, 112, 803, 210/528, 519, 208, 726

[56] References Cited

U.S. PATENT DOCUMENTS

| | | | |
|---|---|---|---|
| 2,355,069 | 8/1944 | Green | 210/208 |
| 3,184,065 | 5/1965 | Bradford | 210/519 |
| 4,226,714 | 10/1980 | Furness et al. | 210/104 |
| 4,278,541 | 7/1981 | Eis et al. | 210/112 |
| 4,348,278 | 9/1982 | Caccia | 210/86 |
| 4,710,291 | 12/1987 | Condolios | 210/519 |
| 4,999,115 | 3/1991 | Peterson | 210/519 |
| 5,080,803 | 1/1992 | Bagatto et al. | 210/803 |

FOREIGN PATENT DOCUMENTS 3-146101  6/1991  Japan ................................ 210/112

Primary Examiner—Wilbur Bascomb, Jr.
Attorney, Agent, or Firm—Cooper & Dunham

[57] ABSTRACT

An apparatus for separating solids suspended in incoming pressurized liquid slurry is disclosed. The apparatus comprises a vessel having an elongated cylindrical vessel wall, a closed upper end and a bottom section for accumulation of solids. The vessel includes a stirrer mounted for rotation along an inside surface of the bottom section and a discharge spool mounted beneath the bottom section including at least one opening. An underflow pump is provided for discharging separated solids without loss of pressure in the apparatus. The apparatus further includes means for detecting solids level in the apparatus, which preferably operates without disturbing settling of the solids therein. Also, the apparatus includes a feedwell for receiving an incoming pressurized slurry stream, the feedwell having an opening a predetermined distance above a level in the apparatus defined by settled solids.

14 Claims, 3 Drawing Sheets

PRESSURE DECANTER

FIELD OF THE INVENTION

This invention relates to an apparatus for separating solids from liquid under pressure and more particularly to a pressurized decanter for separating red mud from Bayer process liquor without need to depressurize the slurry.

BACKGROUND OF THE INVENTION

The Bayer process, now more than 100 years old, extracts alumina from bauxite ore by contacting crushed or pulverized bauxite with a hot solution of caustic soda to dissolve the aluminum hydroxides contained therein as sodium aluminate. The remaining undigested insoluble residue, known as red mud, is separated from the solution usually by filtration or sedimentation or both.

Red mud typically includes large quantities of finely divided solids resistant to separation. Alumina manufacturing therefore creates a need for improved separation systems, particularly those that can rapidly separate large quantities of slurries in an efficient manner.

In this connection, some preliminary attempts appear to have been made to use pressurized settling devices in clarifying finely divided solids from slurries. U.S. Pat. No. 2,107,919 (Turner) appears to discuss a pressure digester placed between two blow off tanks. U.S. Pat. No. 4,994,244 (Fulford) states that separation of red mud from the digested slurry can be carried out at a temperature below the boiling atmospheric temperature of the liquor phase of the slurry. U.S. Pat. No. 5,080,803 (Bagatto) discusses a process and apparatus for decanting suspensions at and above the atmospheric boiling point of the suspension. The apparatus operates at atmospheric pressure.

While the foregoing references discuss attempts to increase separation efficiency of finely divided solids from slurries, there exists a need, particularly in the aluminum industry, for improved systems to carry out separation at high pressure and temperature.

SUMMARY OF THE INVENTION

The present invention provides an apparatus and method which overcomes the disadvantages of the prior art. The present invention therefore broadly contemplates the provision of an apparatus for separating solids suspended in incoming pressurized liquid slurry. The apparatus comprises a vessel having an elongated cylindrical vessel wall, a closed upper end and a bottom section for accumulation of solids. The vessel includes a stirrer mounted for rotation along an inside surface of the bottom section and a discharge spool mounted beneath the bottom section including at least one opening. An underflow pump is provided for discharging separated solids without loss of pressure in the apparatus. The apparatus further includes means for detecting solids level in the apparatus, which preferably operates without disturbing settling of the solids therein. Also, the apparatus includes a feedwell for receiving an incoming pressurized slurry stream, the feedwell having an opening a predetermined distance above a level in the apparatus defined by settled solids.

Preferably, the inlet pipe to the feedwell includes first and second flocculant injectors, the first injector located adjacent an entry port to the feedwell, the second injector located upstream of the first injector. The feedwell has an opening a predetermined minimum distance above the expected level of settled solids to discharge the slurry stream.

The invention also provides a process for separating solids in a pressurized slurry. The process comprises feeding a pressurized slurry into an intake pipe having an inverted elbow bend connected to a feedwell, injecting a first portion of flocculant into the slurry at a location adjacent to the region of turbulence generated by the elbow bend. The process further includes injecting, at a location adjacent the opening of the feedwell, a second portion of the flocculant. Following this, the process includes passing the slurry into the feedwell at a velocity not greater than about 1 m/sec and permitting the slurry to enter into the vessel such that the slurry falls a predetermined distance at a predetermined velocity into a closed elongated cylindrical vessel. This allows solids in the slurry to separate efficiently from liquid and collect in a bottom portion of the cylindrical vessel. The solids can be removed from the bottom portion through a discharge spool without depressurizing the vessel, while the clarified liquor or supernatant can be removed at an exit pipe in the decanter also without loss of pressure.

DETAILED DESCRIPTION OF THE PREFERRED EMBODIMENTS

Figure 1:
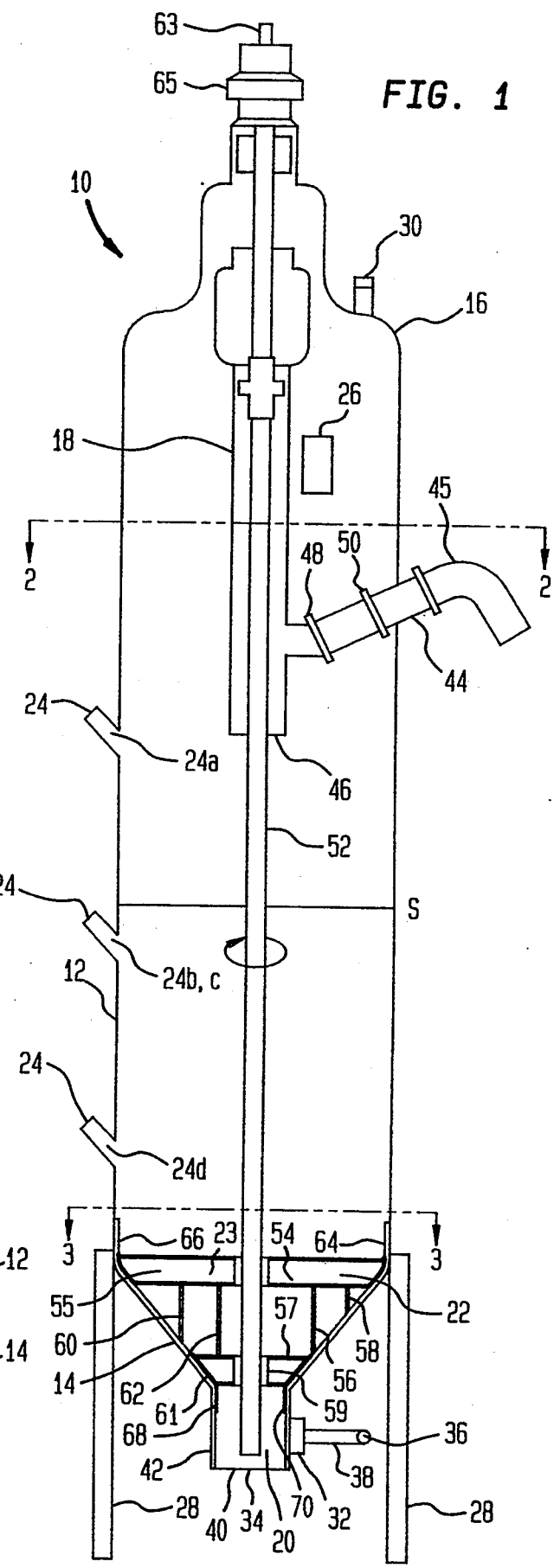
FIG. 1 is a front view in section of the improved pressure decanter of the present invention.

FIGS. 1–4 illustrate a preferred embodiment of the pressure decanter of the present invention generally designated with the reference numeral 10. The pressure decanter 10 generally includes a cylindrical pressure vessel 12, a preferably conical bottom section 14, a closed upper end 16, a deep feedwell 18 for incoming pressurized slurry, and an enlarged spool 20 below the conical bottom section 14 to facilitate removal of solids from the decanter 10. The apparatus also includes a stirrer 22 inside the bottom section 14, a plurality of mud level detectors 24 to determine the level of settled solids. The vessel 10 stands generally upright as shown in FIG. 1 and is supported by legs 28.

The cylindrical pressure vessel 12 has an elongated cylindrical vessel wall of sufficient strength and thickness to withstand the pressures, temperatures and corrosiveness of the contents such as pressurized slurry of red mud in pregnant caustic liquor solution. The preferred material of fabrication for the vessel is mild steel of a thickness of about 1.5 cm., or more, depending on the pressure. For example, an exemplary embodiment for use in the Bayer process has a height and diameter of 14 m. and about 3 m., respectively.

The cylindrical pressure vessel 12 has a dish-shaped closed upper end 16 and a plurality of vents 30 to permit release of accumulated gases that accumulate in the vessel 12 during operation. The vents 30 are operated manually as the need arises. The cylindrical pressure vessel 12 is elongated as shown in FIG. 1 and preferably has a length-to-diameter ratio of between 2 and 6. In one preferred embodiment the length-to-diameter ratio approximates 4.5. Adjustments can be made to the length and width depending on the particular application desired.

As mentioned above, the vessel 12 also includes a bottom section 14 for accumulation of solids. The bottom section 14 may be either hemispherical or conical, although conical is preferred for ease of fabrication. Preferably, the bottom section 14 has inclined sides as shown in FIG. 1, and these inclined sides should make an angle between 30°-60° from the horizontal. An angle of about 45° is preferred, because such a conical shape is easiest to fabricate, poses the acceptable height penalty, while providing for a good flow of solids from the vessel 12. The approximately 45° to the vertical angle promotes slippage of solids along the wall 14 into the discharge spool 20.

The discharge spool 20 mounted beneath the bottom section 14 includes at least one opening 32 which serves as the exit port, and additional ports (not shown) may be provided for the injection of a fluid or slurry to clear away blockages. The discharge spool 20 is a cylindrical extension to the bottom section 14 and terminates in a flat plate 34. Solids (not shown) pass into the spool 20 and then out through the exit port 32. A takeoff pump 36 is provided in the pipeline 38 leading from the exit port 32 and provides a flow rate of thickened solids preferably less than about 1 m/sec.

In designing the pressure decanter 10 of the present invention, certain additional parameters relating to the discharge spool 20 have been found to be significant; (1) the spool must be at least 2 times larger in area than the cross sectional area of the exit opening; (2) the spool may incorporate a steady bearing mounted on the bottom plate, which closes the spool; and (3) the clearance between the shaft 40 and the wall 42 of the spool 20 is approximately equal to the diameter of the takeoff pipe 38.

The pressure decanter 10 includes an inlet pipe 44 through which pressurized solid-liquid slurry is fed into the pressure decanter 10. The inlet pipe 44 feeds into an elongated or deep feedwell 18 as more fully described in our coassigned, copending patent application Ser. No. 08/059,443, filed on even date herewith. The contents of that copending application are hereby incorporated by reference herein.

Briefly, the feedwell 18 has an opening 46 a predetermined distance above a level in the apparatus 10 defined by settled solids S to permit solids to pass into the main chamber of the pressure decanter 10. The inlet pipe 44 includes first and second flocculant injectors 48, 50. The first injector 48 is located adjacent the entry port to the feedwell 18, while the second flocculant injector 50 is located upstream from the first injector 48, as shown schematically in FIG. 1. The preferred placement of the first and second injectors 48, 50 and the relative proportions as well as the type of flocculant which preferably should be used are described more fully in our above-referenced copending application to which reference is made. As explained more fully in that application, the inlet pipe 44 preferably has an elbow 45 and the second flocculant injection point is positioned ahead of the elbow 45, between the elbow 45 and the entry to the feedwell 18.

Figure 3:
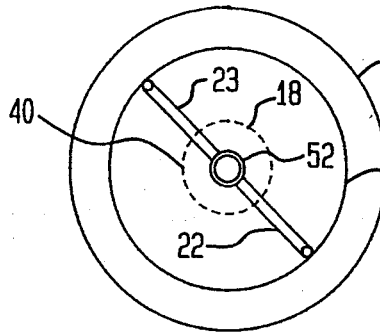
FIG. 3 is a sectional view of the improved pressure decanter of FIG. 1 taken along line 3—3 in FIG. 1.

The drive shaft 52 includes in the bottom section 14 stirrers 22, 23. Referring to a first one of the stirrers 22 shown in FIG. 1, it includes a horizontally extending girder-like arm 54 extending from the drive shaft 52. The stirrer further includes vertical or near vertical members 56, 58. Preferably similar or identical two stirrers 22, 23 are mounted diametrically opposite each other on the drive shaft 52 as shown in FIGS. 1 and 3. The stirrers 22 and 23 follow the profile of the bottom section 14 and is positioned to leave as little unswept area as possible. The stirrers 22 and 23 comprise a substantially vertical rod-like member which enhances the dewatering of the slurry (not shown). The stirrers 22, 23 are preferably solid rods $\frac{1}{2}''$ or $\frac{3}{4}''$ thick, either circular or diamond shaped in cross-section to present the least resistance to accumulated solids. Preferably the stirrers 22, 23 should be spaced about 18" apart.

Figure 4:
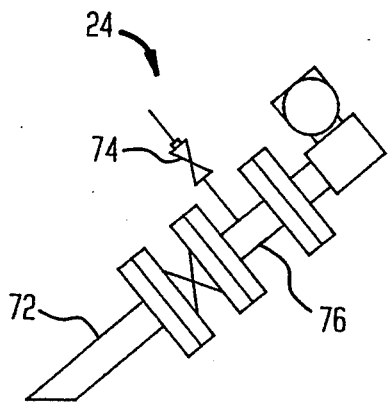
FIG. 4 is a schematic representation of a mounting for a level indicator for use in the improved pressure decanter of FIG. 1.
Figure 2:
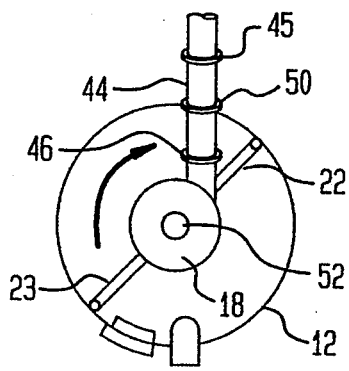
FIG. 2 is a sectional view, partially broken away, of the improved pressure decanter of FIG. 1, taken along line 2—2 in FIG. 1.

The vertical members 56, 58 for one stirrer are offset from those on the other stirrers 60, 62 so that the entire bottom section 14 can be stirred. In other words, each vertical member (56,58,60,62) sweeps a different cylindrical space within the bottom conical section 14 when shaft 52 turns. The horizontal arms 54, 55 close to the vertical wall of the cylindrical pressure vessel 12 to scrape away any solids that may adhere to the wall. A lower member 57 comprising two smaller horizontal arms 59, 61 sweeps the lower portion of the bottom section 14. Downwardly projecting rods 68, 70 near the center of the drive shaft 52 extend into the discharge spool 20 to clear away any stationary solids in the spool 20. The projecting rods 68, 70 are rectangular in cross section and are positioned so that a major flat side is opposite the exit spool 20 surface so as to provide a perpendicular cutting edge for the removal of adhering solids. The shaft 52 is turned by an electric motor 63 having suitable reduction gearing 65 to reduce the speed of the motor from 1800 r.p.m. to about 0.52 r.p.m. A suitable motor is one operating at 3.7 Kw, 220 V, 60 Hz, developing a torque of about 3000 kg-m. FIG. 4 illustrates schematically the installation of one of the mud level indicators 24 of the present invention. Preferably, the mud level indicators 24 are nonintrusive pressure gauges, since mechanical gauges involving float and pulley arrangements would be adversely affected by the pressure and fluid in the vessel. Several indicators 24 are used, and they are mounted one above the other. The sensors 24 measure the pressure exerted against them at each point where they are located. The higher the solids content, the greater the pressure exerted. Therefore, the sensors can detect the presence of denser solids containing liquid as opposed to clear liquor floating above the denser material. Various types of nonintrusive gauges can be used such as ultrasonic, radiation type (gamma gauge) or preferably gauges operating on the differential pressure principle such as those made and sold by Rosemount, Inc. of Eden Prairie, Minn. under Models 1151DP/GP and 1144G. The construction and operation of such devices are described, for example, in U.S. Pat. Nos. 3,618,390 and 3,646,538.

Briefly, pressure displaces the remote diaphragm transmitting the measured pressure through a liquid filled system to the instrument element. The transmitted pressure displaces a sensing diaphragm creating a differential capacitance between sensing diaphragm and the capacitor plates. This differential capacitance is converted to an electrical signal which can be measured by a suitable instrument to provide information on pressure difference to operate a moving plotter or the like. As shown in FIG. 4, the gauges 24 are connected to the vessel 12 through inclined nozzles or pipes 72. These pipes 72 are approximately the same diameter as the flange 73 of the gauge 24 to help prevent solids from lodging inside the nozzle 72. The tube 72 connects via an isolation valve 75, which is a gate or ball valve or other type, to a further tube portion including a purging spool 76 connected to a flushing liquid line 74, through which purge liquid such as water or stream condensate keeps the nozzle 72 free of solids.

Preferably, as shown in FIG. 1, the pressure sensors 24 are located to maximize the accuracy of their measurements, and reduce their tendency to plug with solids. The difference in their measurements is transmitted because it will cancel out the effect of variations of pressure inside the pressure decanter 10. Preferably a first sensor 24a is installed some distance above the expected top level of the bed of settled solids S, as shown in FIG. 1. A pair of sensors 24b, 24c are installed one above the other near the top of the level of settled solids S. Finally, another sensor 24d is installed some distance below the expected level of the top of the settled solids level S. With this arrangement, the signals that are transmitted to monitor the solids level in the cylinder represent the difference between sensors 24a, 24b (considered to be the upper detector) and the difference between sensors 24c and 24d (considered to be the lower detector).

Having described the structure of the apparatus 10, its operation can now be understood with reference to the clarification of Bayer process slurry involving the separation of red mud solids from hot fresh pregnant Bayer process liquor still at approximately the same pressure and temperature as in the digestion process. A pressurized stream of Bayer process slurry including red mud and the pregnant liquor (not shown) enters through inlet pipe 44 wherein it receives two injections in two stages of flocculant from first and second injectors 48, 50. Preferably the flocculant used is an anionic sodium polyacrylate or similar flocculant, such as ALCAR 600 available from Allied Colloids, Limited, diluted to a concentration of less than about 1.0% by weight. The minor portion 0-50%, preferably about 30%, of the total amount of flocculant is added through the second injection point 50 is located beyond the elbow 45 in the slurry inlet pipe 44, near the highest point just after change in direction. At this point in the inlet pipe 44 maximum turbulence occurs. The slurry slides downward in the inclined inlet pipe 44 through this zone of maximum turbulence toward the feedwell 18, receives by injection the major portion of the flocculant, between about 50% and about 100%, preferably about 70%, through the first flocculant injector 48. When the slurry is adjacent the entry to the decanter, the velocity of the slurry is not greater than about 1 m/sec. The slurry enters the feedwell 18 where it is directed downwardly through the extended elongated column 18 of the feedwell until it reaches the discharge opening 46. At this point, the velocity and kinetic energy of the slurry is such that when it impinges on the settled solids S already in the feedwell 18 it causes the least disturbance to the settled solids in the apparatus 10. While the apparatus 10 is in operation, the level above the settled solids is filled with increasingly clear liquid. The solids begin to deposit themselves as flocs at the top of the level of settled solids S. As the solids settle toward the bottom section 14, they lose more and more of their liquid content, and dewatering is aided by stirrers 22, 23 rotated by shaft 52. By the time they reach spool 20, they are most dense and may be withdrawn through exit port 32 in the spool 20 with the aid of the underflow pump 36. The final dewatering of solids from liquid is helped by the slow rotation of the shaft 52 turning stirrer 22.

The following examples are meant to be illustrative of the practices of the invention and not intended to be limiting.

Example 1

An improved pressure decanter in accordance with the invention was used for a two-month period. The feed slurry of red mud was obtained by extracting Australian bauxite in 180 g/l caustic, expressed as $Na_2CO_3$, at 130°–150° C. The resulting slurry of red mud contained from 50 to 90 g/L solids. During the test period, the slurry flowed into the decanter at a rate of up to 225 cubic meters per hour equivalent to processing up to 42 tons per hour of bauxite, depending on the alumina content. The rate of addition of synthetic flocculant was varied around the target level of 120 g/ton of bauxite. The upward velocity of the liquor in the annulus between the feedwell and the exterior wall of the vessel was about 21 m/hr, and the solids content of the underflow exiting from the decanter was between 40 and 50%.

Figure 5A:
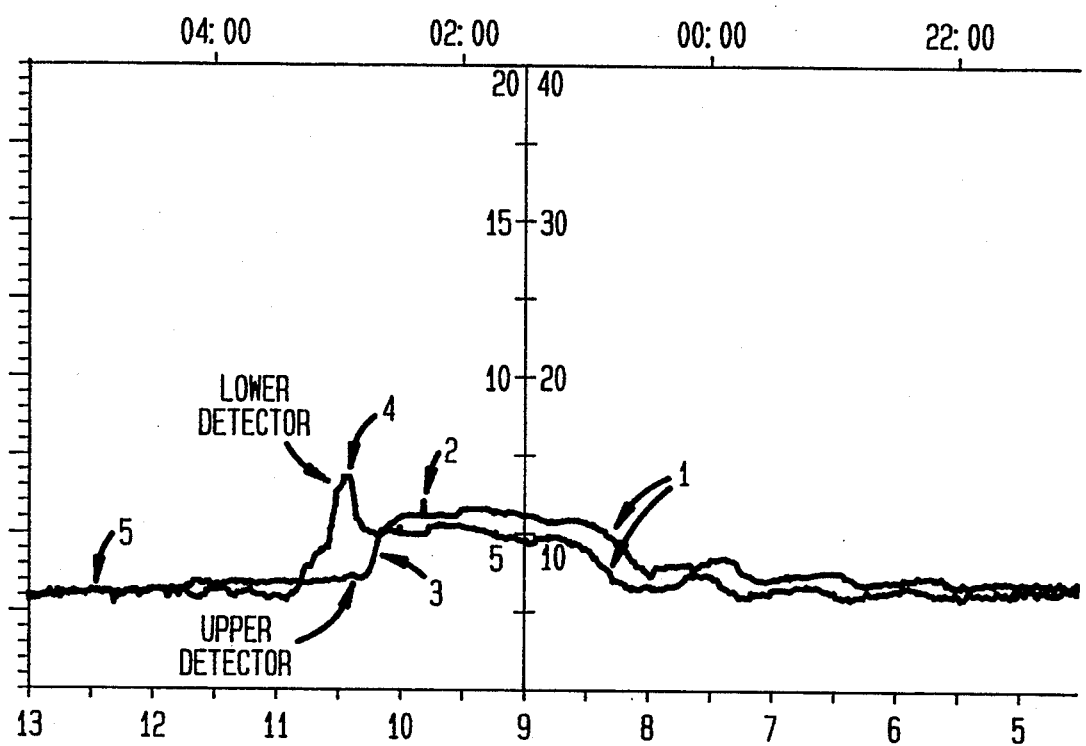
FIG. 5A is a graphical representation of settling in the improved pressure decanter of FIG. 1 measured at a first level detector.
Figure 5B:
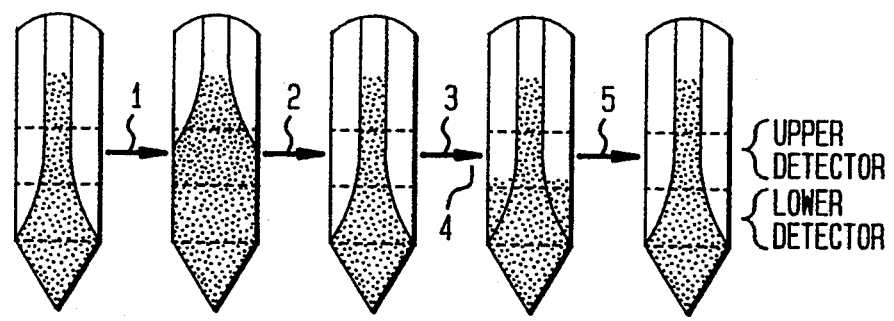
FIG. 5B is a schematic drawing representing the level of settled solids in the pressure decanter at various time intervals in the run depicted in FIG. 5A.
Figure 6A:
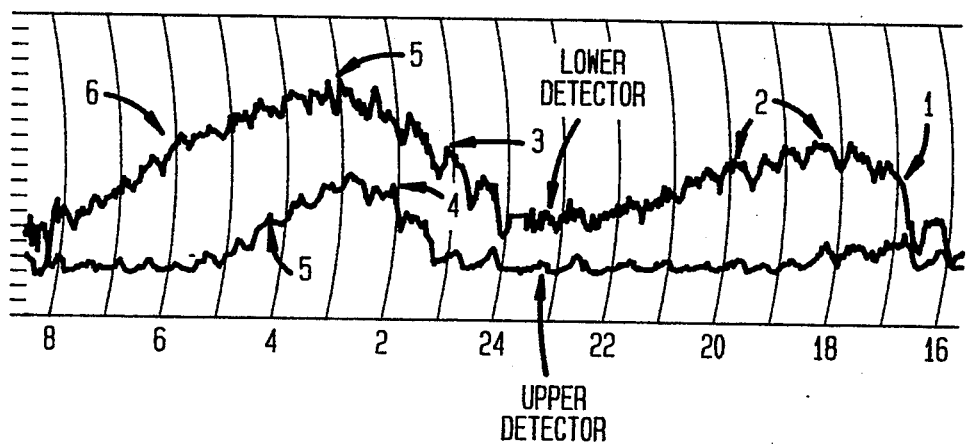
FIG. 6A is a graphical representation of settling in the improved pressure decanter of FIG. 1 measured at a second level detector.
Figure 6B:
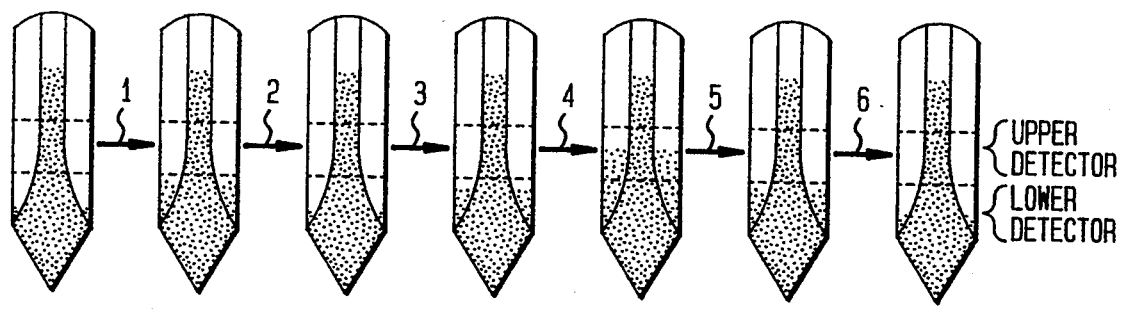
FIG. 6B is a schematic drawing representing the level of settled solids in the pressure decanter at various time intervals in the test run depicted in FIG. 6B.

FIGS. 5 and 6 are strip charts (run from right to left) which show the effect of these changes in the flocculant addition and the slurry feed rate as recorded by the upper and lower level detectors. The sketches at the bottom of the figure indicate schematically the position of the bed of settled solids at the various time intervals.

Example 2

The performance of the pressure decanter of the invention was compared with that of the conventional settlers operating at atmospheric and also with a deep settler operating at a temperature slightly above the atmospheric pressure boiling point of the liquid being separated, similar to that described in U.S. Pat. No. 5,080,030.

The pressure decanter of the invention was found to handle a mud load greater by an order of magnitude than the other settlers and to provide an overflow (O'F) clarity better by a factor of 2 or more. The suspended solids averaged 20–25 mg/L, compared with 200 mg/l for the conventional settlers. The invention gave a higher content of solids in the underflow (U/F) at 42% compared with 30–32% in the conventional equipment.

We claim:

1. An apparatus for separating solids suspended in an incoming pressurized liquid slurry comprising:
    a vessel having an elongated cylindrical vessel wall, a closed upper end and a bottom section for accumulation of solids;

a stirrer mounted for rotation along an inside surface of the bottom section;

a discharge spool mounted beneath the bottom section including at least one opening and an underflow pump for discharging separated solids without pressure loss in the apparatus;

at least one means for detecting solids level in the apparatus substantially without disturbing settling of the solids; and a feedwell for receiving an incoming pressurized slurry stream, the feedwell having an opening above a level in the apparatus defined by settled solids.

2. An apparatus in accordance with claim 1 wherein the elongated cylindrical vessel has a length to diameter ratio of between about 2 to 6.

3. An apparatus in accordance with claim 2, wherein the bottom section has inclined sides forming an angle of between about 30° and about 60° from horizontal.

4. An apparatus in accordance with claim 2 wherein the bottom section is conical and forms angle of between about 30° and about 60° from horizontal.

5. An apparatus in accordance with claim 4 wherein the bottom section is conical and forms an angle of between about 40° to 50°.

6. An apparatus in accordance with claim 2 wherein the bottom section is hemispherical.

7. An apparatus in accordance with claim 2 further comprising a plurality of vents in the upper end for releasing gases from the vessel.

8. An apparatus in accordance with claim 1 wherein the stirrer comprises at least one vertical bar extending upwardly with respect to the bottom section along at least a portion of the cylindrical wall to dislodge solids on the wall.

9. An apparatus in accordance with claim 8 wherein the stirrer additionally comprises at least one vertical bar extending downwardly into the spool section to dislodge solids therein.

10. An apparatus in accordance with claim 2 wherein said at least one means for detecting solids level is a plurality of noninvasive differential pressure detectors mounted on the cylindrical wall, a first one located above an expected upper level of settled solids, a second one located approximately at the expected upper level of settled solids, and a third one located below the expected upper level of settled solids.

11. An apparatus in accordance with claim 10 wherein each of the plurality of pressure differential detectors connect to the interior of the pressure vessel through an inclined nozzle or pipe.

12. An apparatus in accordance with claim 2 wherein the feedwell further comprises first and second flocculant injectors, the first injector located adjacent an entry port to the feedwell, the second injector located upstream of the first injector.

13. An apparatus in accordance with claim 12 wherein said slurry comprises red mud solids suspended in Bayer process pregnant liquor.

14. An apparatus for separating solids suspended in an incoming pressurized liquid slurry, comprising:

a vessel having an elongated cylindrical wall, a closed upper end, and a conical bottom section for accumulation of solids;

a stirrer having at least one vertical bar extending upwardly with respect to the bottom section along the cylindrical wall to dislodge solids adhering thereto;

a discharge spool mounted beneath the conical bottom section, having an opening for discharge of accumulated solids and an underflow pump for discharging settled solids without pressure loss in the apparatus;

a plurality of noninvasive pressure differential sensors mounted on the cylindrical wall, a first one located below an expected level of settled solids, a second one located at about the expected level of settled solids, and a third one located above the expected level of settled solids; and a feedwell comprising a container mounted in the vessel defining an inlet for receiving an incoming pressurized slurry stream, an outlet positioned above the expected level of settled solids in the vessel, and first and second flocculant injectors, the first injector located adjacent the inlet to the feedwell, the second located in an inlet pipe upstream of the first injector.

* * * * *